March 2, 1943.  T. A. PETERSON  2,312,439
WOOD PLANING MACHINE
Filed July 3, 1940  2 Sheets-Sheet 1
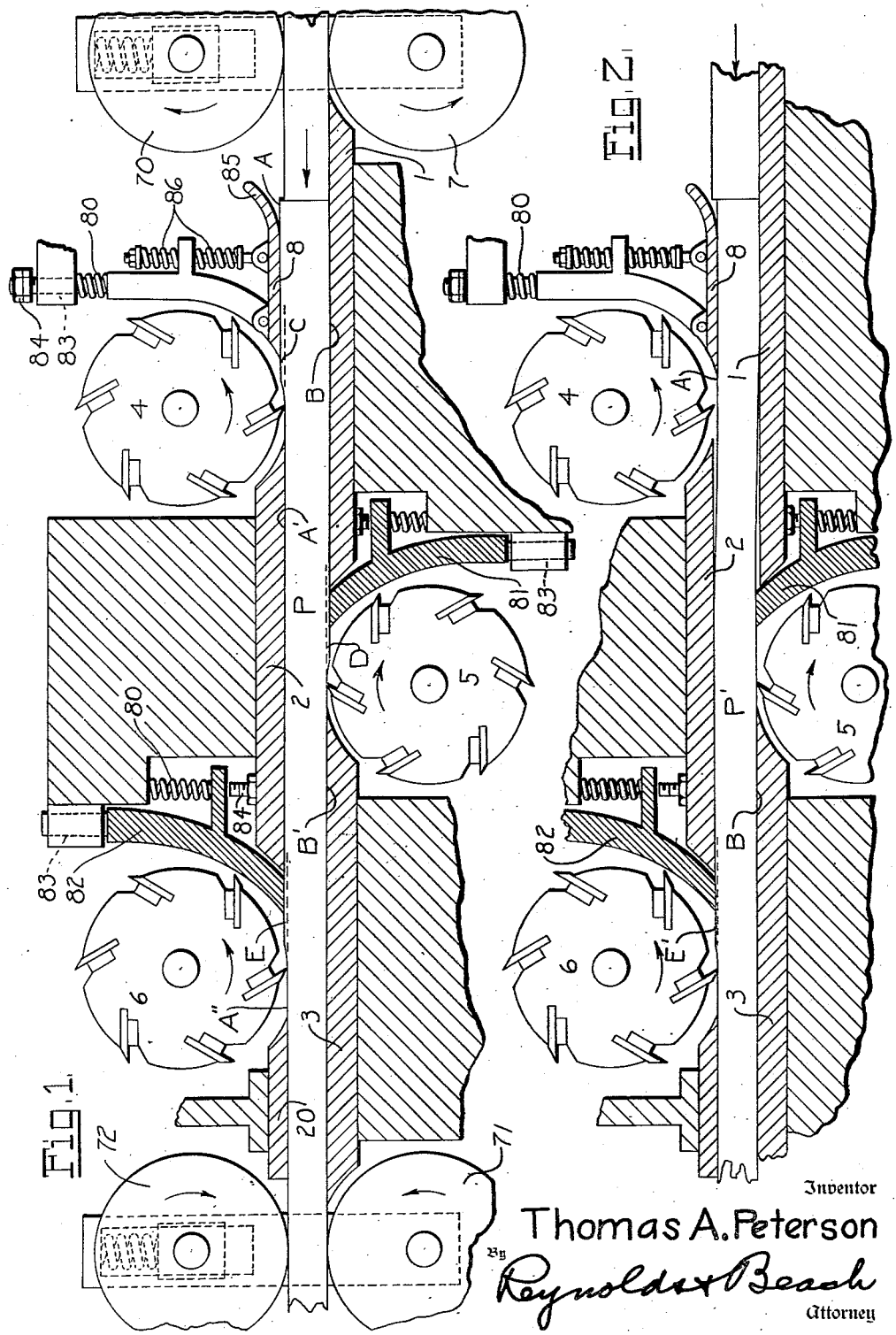
Inventor
Thomas A. Peterson
By Reynolds + Beach
Attorney March 2, 1943. T. A. PETERSON 2,312,439
WOOD PLANING MACHINE
Filed July 3, 1940 2 Sheets-Sheet 2
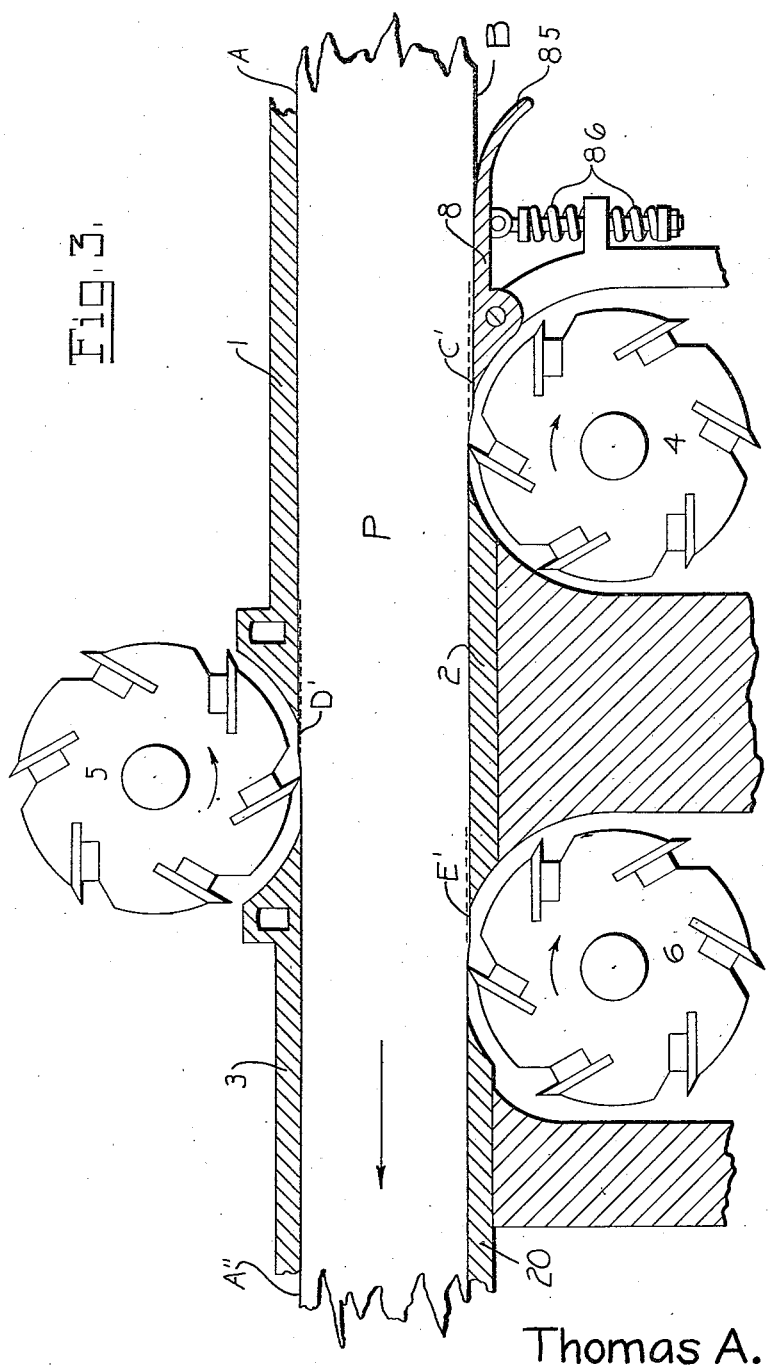
Inventor
Thomas A. Peterson
By Reynolds & Beach
Attorney Patented Mar. 2, 1943

2,312,439

UNITED STATES PATENT OFFICE 2,312,439

WOOD PLANING MACHINE

Thomas A. Peterson, Longview, Wash.

Application July 3, 1940, Serial No. 343,744

4 Claims. (Cl. 144—116)

This invention relates to the surfacing of lumber, by some form of planing operation, usually effected by cutter heads, along two opposite faces to substantially exact dimensions or thickness. For a discussion of the reasons for so doing, of the disadvantages of failing so to do, and of the problems involved in the doing thereof, reference is made to the patent to Nicholson and Pritchard, No. 2,102,186.

The terms "planing" or "surfacing" are to be taken in the broad sense. Most such operations will involve the plane surfacing of boards, and usually at top and bottom faces, but edge surfacing or edging is also included, as also matching, molding, or any type of forming to patterns by material-removing operations at opposite faces of a lumber piece.

In all known prior practice it has been customary to effect such planing by two operations only. Usually the top face is planed first, to remove all material in excess of the finished thickness plus the expected bottom cut, gauging from the rough bottom face in so doing, and then the bottom face is planed to remove the thickness of the intended bottom cut. Regardless of whether the top face or the bottom face is first planed, the only subsequent operation has been the planing of the opposite face. Nicholson has disclosed a variation of that practice, which is particularly effective when applied to pieces of subnormal rough thickness, but still two cuts only are employed. In all such prior practice, operating upon boards of normal rough thickness, the first cutter head is set to remove the greater depth of material, for the reason that it is desired to remove only a minimum cut from the bottom face, of pieces of subnormal thickness particularly, and hence the first cutter head, operating upon the top face, removes all material down to finished thickness plus only this minimum bottom cut.

It has been found that this inequality of depth of cut, in normal pieces, imposes a large load upon the first cutter head and its individual driving motor (the one which normally removes the deeper cut), and a materially smaller load upon the second cutter head and motor.

For various reasons, among them such overloading of one of the cutter heads as compared to the other, it has been found scarcely possible to effect proper planing of one surface of the lumber, smoothly and without perceptible waves. The cutter head's intended rotational speed is sufficient, in relation to the high actual lineal speed of the lumber, that such waves, appearing as recurring distinct individual knife gouges in the planed surface, are so slight as to be substantially unnoticeable. When the cutter head is overload, in removing at one pass all the excess thickness and in making at the same time a finish cut, the peripheral speed of the cutter head is reduced. As a result the individual knife gouges or waves do not merge smoothly and imperceptibly into each other, but instead the knives engage the piece less frequently per unit of the latter's linear travel, and the waves are accentuated. The initial (and the heaviest) cut being usually taken from the intended top or exposed face of the board, the waved surface is hence particularly noticeable—more so than if it were upon the back face. It is an important object of this invention to avoid noticeable waves—in other words, to produce a smoother surface—by proper relative arrangement of the parts of the planing machine, and by an improved method of planing.

Uneven thickness occurs, by reason of rapid wear of the knives, dulling thereof, excessive pressure on the board by feeding means, resulting in compression of the board, and its later expansion, and like causes. It is a further object, by elimination of the causes through an improved arrangement of the parts of the machine and of the steps of the method, to avoid uneven thickness.

It is necessary, of course, to back up the lumber piece, at the side or face opposite each cutter head by stationary guide elements, as otherwise chattering, uneven surfacing, and varying thickness would certainly occur. While this means that the piece as it advances is engaged at the two faces, it has been considered necessary heretofore to leave the piece loose in its guides, for "free feeding." It has not been considered desirable, nor even feasible, to engage the piece closely at both sides in the same area, and perhaps with former arrangements, involving rapid wear, waving, uneven thickness, and like departures from precision, such close or contiguous engagement of opposite faces of the piece was not feasible. Nicholson even went so far as to leave sufficient freedom that the piece might be flexed within the guides.

Nevertheless, such close guiding engagement of the piece is desirable, if possible, for it assures greater accuracy of thickness and of surface, freedom from chattering, lessens wear, and permits greater precision with less difficulty throughout the operation. It is an object of this invention to provide a method and mechanism whereby such close guiding engagement may practically be achieved, notwithstanding the apparently insuperable difficulties set forth in the Nicholson specification, for instance.

Nicholson, in attempting to avoid certain of the disadvantages pointed out above and in that specification, provided guide elements purposely spaced apart in excess of the thickness of the board, so that the board might be flexed, intermediate the two cutter heads engaging opposite board faces, from contact with one guide element only into contact with the opposite guide element only. The boards being thus flexed by strong presser members, and the cutter heads being spaced a given distance or clearance from the respective guide elements, this served as a thickness gauge for the opposite faces.

This produced results generally superior to prior practice, at least upon boards which were not too thick nor too heavy (perhaps by reason of being unusually wide) to be thus flexed by the presser members. Such machines, however, must operate from time to time upon boards of greatly varying width, hence of greatly varying weight, and upon boards of greatly varying thickness, hence of greatly varying flexibility. While compensating adjustment of the force of the presser members is possible, there are practical limits which can not be exceeded, and within such limits flexing of all boards can not be achieved to the extent necessary to make Nicholson's principle fully effective. It is therefore an object of this invention to provide such a machine wherein the lumber pieces are guided in a straight-line path past the cutter heads, and flexing of the pieces is prevented, preferably by contiguously engaging both faces of the pieces, that is, both faces that are to be or that have been planed, locating the guide elements in planes tangent to the cutter heads, with only running clearance.

The inequality of loads imposed upon the two cutter heads as employed in prior practice, and the results thereof as affecting the surfacing and the thickness of the pieces, has already been pointed out. Besides this, inherently it is not desirable to employ cutter heads the loads whereon are so disproportionate, as has been customary practice, yet this has appeared unavoidable. Such unequal load distribution causes one motor to pull heavily upon the power source, as compared to the other. If the more heavily loaded cutter head unit is built more heavily, it is not easy to keep it in synchronism with the other, and control problems are multiplied by reason of their unbalance. If they are duplicates, the one is overloaded and the other underloaded, which is not a desirable condition, and control is not any easier. Wear on the more greatly loaded unit is high, and results in greater wear on the knives, quicker dulling, more rapid wear on the motor and on bearings, misalignment of bearings, looseness of parts, and finally excessive vibration as wear proceeds. The two units can not be kept "in step." It is therefore highly desirable to equalize more nearly the loads upon each cutter head unit (including the motor), and such is one of the important objects of this invention.

A further disadvantage, already mentioned, of arrangements which fail to guide the pieces firmly, in their passage past the cutter heads, is the tendency of such loosely held boards to chatter. This further accentuates the uneven or wavy appearance of the planed surfaces, and increases the possibility of uneven thickness in the pieces. It is also my object to prevent chattering, and the disadvantageous results thereof, by a method and mechanism which avoids excessive loads on any cutter head, or materially different loads upon different cutter heads, and which holds and guides the pieces in a firm embrace along a straight-line path past the cutter heads both by the disposition of the cutter heads themselves and by guide mechanism associated with them.

As has been mentioned, prior analogous planer devices have attempted to secure the total surfacing in two successive operations, planing first one face and then the opposite face. I have found that materially improved results, in smoothness and accuracy of surface, and in uniformity of thickness, may be accomplished by performing the planing in three instead of two operations, though these three operations should be immediately successive during the advance of the piece, that is they should be performed by rotary cutter heads on alternate sides of the board disposed in juxtaposed relationship, by which I mean the heads are close together with no stationary cutter or edging cutters interposed between the first and last of such three rotary cutter heads. It is a further object of the invention to provide mechanism and a method whereby the rough lumber piece of normal rough thickness is lightly planed first on one face as an initial rough cut, then, using this finished face as a gauge, the lumber piece is planed on the opposite face to a reasonably exact thickness, yet still somewhat greater than the final finished thickness, and is finally finished by resurfacing the first face with a finish cut, gauging for thickness from the finished cut on the opposite or second face.

It is necessary that the top or exposed face of the board be completely and properly planed, yet skipped spots and snipped ends are permissible on the back face. They will occur if the rough thickness of the piece is subnormal, but with ordinary methods and mechanism, which removes a given cut from the top face regardless of the board's rough thickness, a board is often insufficiently planed on its back face, or is too thin when planed on both faces, and must be reworked, or degraded. Nicholson has disclosed how pieces of subnormal rough thickness may be surfaced in a manner to salvage all potentially usable pieces, but at the expense of a loose feed; indeed, he proposes positive flexing of the pieces, as has been pointed out. The close embrace of the piece at opposite sides is desirable, for reasons already given, but it is likewise desirable to utilize all possible pieces—all pieces in which their rough thickness exceeds their finished thickness. It is therefore a further object of this invention to provide a method, and mechanism, normally operable upon pieces of normal rough thickness, but capable of operation without special attention upon pieces of subnormal thickness, in such a way as to insure proper planing of the top face, and, to the extent that the piece's thickness permits, adequate planing of the back or bottom face.

With these and other objects in view, as will appear hereafter, the present invention comprises the novel mechanism, the novel relative arrangement of the parts thereof, and the novel method, as shown in the accompanying drawings, described in this specification, and as will be more particularly defined by the claims which terminate the same.

In the accompanying drawings my invention is shown largely diagrammatically, to illustrate the essentials of the mechanism and the method as applied to the surfacing of the opposite faces of lumber pieces, under varying circumstances.

Figure 1 is a longitudinal vertical section through a wood planer for planing the top and bottom surfaces of pieces, shown as operating upon a piece of normal rough thickness.

Figure 2 is a similar view, showing the mechanism operating upon a piece of subnormal rough thickness, yet of sufficient thickness to be usable.

Figure 3 is a view somewhat similar to Figures 1 and 2, but showing the invention as embodied in an edger, being therefore in part a plan view and in part a horizontal sectional view.

Referring to Figures 1 and 2, the numeral 1 designates a feed table, the numeral 3 a discharge table nearly coplanar with the feed table 1, and 2 is a top guide spaced above the tables 1 and 3. In the arrangement shown, and preferably, the guide 2 overlaps at its opposite ends the tables 1 and 3, respectively. At least these guide members are juxtaposed to define a substantially continuous path through which lumber pieces to be planed are guided. These elements 1, 2, and 3 constitute stationary guides, spaced apart transversely of the path of movement of the piece of lumber, and such path is in fact defined both by these three cooperating guide elements and by the planing cutter heads associated with them. A further guide element 20 may be employed, if desired, spaced above the discharge table 3; its use is optional.

Paired with each such principal guide element and cooperating therewith is a cutter head. Each cutter head is disposed upon the opposite side of the path of the pieces from its cooperating guide element. The three juxtaposed cutter heads 4, 5, and 6 are thus arranged so that heads 4 and 6 lie adjacent each other in alignment at one side of the lumber path, while the third cutter head 5 is disposed intermediate, and preferably generally centrally between, the cutter heads 4 and 6, at the opposite side of the lumber path. In normal operation, therefore, the lateral resistance to cutting of the single intermediate cutter head 5 is opposed by the resistances of both cutter heads 4 and 6, one on each side, which merely creates a slight bending load on a short span of the lumber. Such a load does not appreciably tend to deflect the lumber from a straight path but instead materially reduces reliance upon static guides to hold the lumber piece in its proper lineal path. Where only two juxtaposed cutters are employed, in offset relationship, their combined cutting resistance sets up a force couple on the lumber piece tending to swing it away from both cutters and out of alignment with the described path of travel. In such case entire reliance must be placed upon the auxiliary guide mechanism, whereas in my machine the resistance moments of cutter heads 4 and 6 tend to neutralize each other. Moreover the respective offsets between heads 4 and 6 and head 5 may be established by the location of this intermediate head so that the oppositely acting resistance moments of heads 4 and 6 will be quite accurately balanced for average planing conditions even though the cutting resistances of heads 4 and 6 are normally unequal.

The cutter head 4 is paired with the opposite guide 1, the cutter head 5 with the opposite guide 2, and the cutter head 6 with the opposite guide 3. The particular design of these juxtaposed cutter heads and the manner of their support and drive is largely immaterial, and such details have been largely omitted for clearer illustration. It is sufficient that they be of the planing type, that is, each has a plurality of cutting knives, as shown, and they are supported and driven in any usual or normal way. The direction of their rotation is indicated by arrows on the individual heads, so that the knives contacting the board will move in the direction opposite its direction of translation.

The lumber pieces are suitably fed through the machine, and as suggesting a means to that end there are shown the live rolls 7 and 70, one of which is fixed with relation to the feed table 1 and the other of which is resiliently supported with respect thereto to yield in accordance with variations in the thickness of the individual piece being fed. Similar rolls 71 and 72 may be employed at the discharge table 3.

Adjustment of the width of the path of the lumber pieces naturally must be provided in order that the machine may accommodate different sizes of boards. Since the particular mechanism for effecting adjustment is immaterial, and any suitable form already known for accomplishing such adjustment may be employed, the mechanism itself has not been illustrated, and may take any preferred form. It is only necessary to note that the cutter heads 4 and 6 are so mounted that they are adjustable with the guide element 2, and in such adjustment the spacing, transversely of the path of movement of the pieces, of the cutter head 4 with respect to the cutter head 6, and of each with respect to the guide element 2, is not disturbed. Similarly the cutter head 5 is fixed in position with respect to the tables or guide elements 1 and 3, and if these elements are the ones which are adjustable, then such adjustment must not disturb the relationship, transversely of the path of the lumber pieces, of the respective elements 1, 3, and 5.

For purposes which will shortly appear it is desirable to provide presser means bearing upon the piece as it advances, in the immediate vicinity of each cutter head, urging the board away from the associated cutter head and toward the cooperating guide element on the opposite side of the piece's path. Such presser members may take the form of the chip breakers 8, 81, and 82, urged against the passing piece of lumber by springs 80, suitably guided in frame elements, as indicated at 83, and limited as to movement by the adjustable stops 84. In the case of the first presser member 8 its entering end may up turned by somewhat, as indicated at 85, and it may be yieldably pressed downwardly at this entering end and held yieldingly in position to accommodate different thicknesses of lumber pieces by the opposed springs 86.

A lumber piece of normal rough thickness is shown passing through the machine in Figure 1. The piece is of sufficient length and the several cutter heads are sufficiently closely spaced, that the piece is engaged simultaneously by each one of the cutter heads 4, 5, and 6, and is engaged on its opposite faces simultaneously by the three guide elements 1, 2, and 3. The first cutter head 4 is so spaced with relation to the first guide element 1 that it will remove from a piece of normal rough thickness, or greater, a cut sufficient to reduce the total thickness of the piece to a given known thickness, though a cut not materially greater than subsequent cuts.

The piece P has initially two rough surfaces A and B. It is fed into the machine with the face B upon the feed table 1, and the face A passes beneath the presser member 8, and is removed by the first cutter head 4 to a depth indicated at C. The piece leaves the first cutter head 4 with its upper surface A' roughly finished, and this surface A' is spaced from the still rough or sawn surface B by a given known distance, which can be so accurately determined that the guide element 2, overlapping the guide element 1 and extending closely behind the cutter head 4, may be spaced above the guide element 1 just sufficiently that this guide element 2 closely embraces and contiguously engages the roughly finished top surface A', while the surface B at the same time and in the same area, rests upon the table 1.

The depth of cut, represented by the line C, will of necessity vary with different pieces, for the rough thickness of different pieces is always somewhat variable. However, the first rough cut is preferably so gauged that no large load is imposed upon the cutter head 4, and only sufficient material is removed in this first rough cut to provide a reasonably accurate gauging surface A', and to reduce the total thickness of the piece to an extent that it will pass between but will be contiguously engaged by the guide elements 1 and 2.

It will be noted that the presser element 81 presses upwardly on the surface B and tends to press the rough finished surface A' against the guide element 2. The thickness of the piece has been so accurately gauged, however, by the cutter head 4, that no appreciable deflection of the piece from a straight line path is produced by the pressure of the presser element 81, provided the piece was of rough thickness to begin with sufficient to allow a full finishing cut to be taken by the cutter head 6.

It should be noted that in speaking of the surface A' as being roughly finished it is not to be implied that its surface is materially lacking in smoothness although it will be somewhat uneven because of the rough surface B engaging the guide 1. It is thus designated primarily to distinguish it from the finally finished surface A'', as will appear hereafter.

Continuing its advance, the piece now passes over the cutter head 5, and this is so positioned with relation to the guide element 1 and the guide element 2 that its peripheral path extends slightly above the surface of the guide element 1, to remove a finish cut of no great depth from the under surface B, as represented at D, and to leave a finished bottom face B'. Since the material removed, represented at D, is not a heavy cut, the cutter head 5 is not heavily loaded.

The lumber piece continues its advance, and it will be noted that the finished surface B' continues on to the rigid, stationary guide element or discharge table 3, the surface of which is substantially tangent to the rotary path of the cutter head 5, and slightly above the level of the table 1 by the thickness of the cut D. Likewise the upper guide element 2 extends beyond and overlaps the guide element or table 3, so that again the piece is contiguously engaged at opposite sides simultaneously and in the same area by the guide elements 2 and 3 engaging the respective finished surfaces A' and B'.

Again, as it continues its advance, the piece passes beneath the presser element 82, which presses it toward the guide element 3, but since the piece, now finished to precise thickness, though somewhat less than the thickness in advance of the cutter head 5, is closely embraced by each of the guide elements 2 and 3, no actual movement nor appreciable deflection from the straight-line path occurs by reason of the pressure of the presser 82.

Advancing farther, the piece encounters the rotary cutter head 6, which is spaced slightly closer to its cooperating guide element 3 than is the overlapping guide element 2. Accordingly the cutter head 6 removes a slight finish cut, represented at E, to produce a finally finished surface A''. The cut represented at E is light, and hence the load on the cutter head 6 is not appreciably greater than the load on the cutter head 5, nor is the load on either of these cutter heads materially greater than the load on the first cutter head 4, for the reason that the material which is to be removed from a piece of normal rough thickness may be divided with fair equality between the three cutter heads, and any roughness or inaccuracy of the top face which results from the lack of a smooth gauging surface opposite the first cutter head 4 is removed by the last cutter head 6.

The piece continues on, being held down by the guide element 20, if the latter is used, and between the latter and the table 3, and as it thus leaves the machine it is smoothly and accurately surfaced on both sides, and of accurate thickness, because it has been held, ahead of and behind each cutter head, in a straight-line path, throughout its movement through the machine. It has not been loosely guided nor given any opportunity to chatter. Because the surfacing may be done in each instance with good accuracy, the piece may be at all points in its passage firmly held and contiguously engaged at opposite sides by at least two guide elements, yet without binding. It therefore runs with ample freedom, and is not slowed down, but actually proceeds through the machine at very high speed, in the neighborhood of 700 to 750 lineal feet per minute. Furthermore, because the loads upon the individual cutter heads are reasonably well equalized, and because no one of them is heavily loaded, there is no tendency for the cutter heads to slow down, and the causes of waves in the surface are not permitted to be present.

It would appear that the presser elements 81 and 82 in particular, but also the element 8, have no particular function. In the case of a piece the rough thickness of which is approximately normal, this is substantially true, and the machine, except as these elements constitute chip breakers (that is to say, without regard to their function as presser members), could operate with equal facility and accuracy without them. They are desirable and valuable when operating upon a piece the rough thickness of which is subnormal, and the operation upon such a piece is shown in Figure 2.

In Figure 2 the piece P' is of subnormal thickness initially, yet of sufficient thickness that it can be surfaced properly on at least one side, and to a sufficient degree on the opposite face. Such a piece P', when it enters the machine, is pressed downward immediately by the presser member 8, the spring 80 of which is of sufficient strength to hold down the piece B' against the guide element 1, and hence to hold it so that its upper surface A is but little or not at all removed by the cutter head 4. As shown in Figure 2, the board is held down out of reach of the cutter head 4, and is not surfaced thereby at all.

Passing beyond the cutter head 4, the piece next encounters the presser element 81. This urges the piece upwardly against the guide element 2. If the piece is now of a thickness greater than the clearance of the cutter head 5 from the cooperating guide element 2, the under face of the piece will be surfaced by the cutter head 5. If it is not of adequate thickness, then again it will not be surfaced completely, although if it is thick enough for the cutter head 6 to take a satisfactory finish cut it probably will be skip-spotted sufficiently to true up its thickness to be passable, for presser member 81 alone is not stiff enough to lift the lumber piece into firm engagement with guide 2 without the assistance of the force created by the cutter head by resistance to cutting. In Figure 2 the lumber piece has been shown of inadequate thickness, consequently the under surface B is not completely surfaced by the cutter head 5, and the piece passes beyond to be engaged by the presser 82.

If the piece is of usable thickness it will now be of thickness in excess of the clearance of the cutter head 6 from the guide element or table 3, and a portion of its surface will be removed, as indicated at E', by the cutter head 6. This cut, however, cannot be of material depth, for the reason that if the piece were so thick as to require a material depth of cut at this point it would be sufficiently thick that a full surfacing cut would have been taken off at one or both of the preceding cutter heads. Accordingly material is removed from the top face, as indicated at E', and the piece passes on beyond and out of the machine with at least one surface properly planed and finished, and with perhaps some planing on the opposite face, if in some portions of its length it was of sufficient thickness to be engaged by the cutter head 5.

Thus it will be seen that while it is intended that the lumber piece shall be so engaged at opposite faces that it will be held against deflection, and will be guided in a straight-line path, nevertheless if the piece is of insufficient rough thickness it can still be planed and used, without requiring special attention, and removal of excess material, which might make it too thin, is avoided.

Similar principles can be employed in other types of wood surfacing machines. To illustrate this an edger has been shown in Figure 3. The operations here are substantially the same as in the surface planer illustrated in Figures 1 and 2, and parts have been designated by the same numerals where applicable. Presser members, however, are largely unnecessary in this form, since a board would not be passed through the edger unless it were initially of adequate width.

The principles of this invention find their greatest usefulness when three cutter heads and corresponding guide elements are used. At the same time, the fact should not be overlooked that the proper straight-line guidance, and embracing the piece at opposite faces ahead of and behind a cutter head, are useful when only two cutter heads are used, and indeed when only one is considered.

What I claim as my invention is:

1. In a double surface wood planer, a fixed feed table, a stationary guide in part overlapping and in part extending beyond said feed table, and spaced therefrom a given distance, a stationary discharge table in part overlapping and in part extending beyond the guide, and spaced therefrom less than the distance between said guide and said feed table, three planing cutter heads spaced along the path of travel of a lumber piece as defined by said tables and guide, the first cutter head being disposed opposite the feed table and clearing the same by an amount equal to the spacing between the feed table and the guide, to remove the first, rough cut from one surface of a lumber piece of normal or greater than normal thickness, the next cutter head being disposed opposite the guide and clearing the latter by an amount equal to the spacing between the guide and the discharge table, to remove a finish cut from the opposite surface of such piece, and the third cutter head being disposed adjacent to said stationary guide and opposite the discharge table, and clearing the same by an amount less than the spacing between the guide and the discharge table, to remove a finish cut from the first surface of the piece, said cutter heads being disposed in closely juxtaposed relationship to each other along the path of travel of the lumber piece and the ends of said feed and discharge tables and the ends of said guide nearer said cutter heads being disposed closely adjacent to the respectively proximate cutter heads, to positively insure straight-line movement of and to hold against chattering throughout its length that portion of a lumber piece being planed which is disposed between said first and third cutter heads during advance of the lumber piece through the machine, thereby to avoid cutter head-produced ridges in the planed surfaces and to assure smoothness of said surfaces.

2. A planing machine as set forth in claim 1 including a guide element closely adjacent to the third cutter head at the discharge side thereof and opposite the discharge table and clearing said table by an amount equal to the spacing between the discharge table and said third cutter head for cooperation with the discharge table to hold against chattering that portion of the lumber piece which is disposed adjacent to the third cutter head at the discharge side thereof during advance of the lumber piece through the machine.

3. In a machine for simultaneously planing opposite surfaces of a piece of lumber, means defining a path of travel for a lumber piece to be advanced through the machine, said means including guide elements disposed at opposite sides of said path to engage opposite surfaces of the lumber piece, a first cutter head disposed at one side of said path opposite and spaced from a guide element at the other side of said path for removing a first rough cut from one surface of the lumber piece, a second cutter head, said second cutter head being disposed at the other side of said path and at the discharge side of said first mentioned cutter head and opposite and spaced from a guide element at the first mentioned side of said path for removing a finishing cut from the opposite surface of the lumber piece, a third cutter head, said third cutter head being disposed at the first mentioned side of said path at the discharge side of said second cutter head and opposite and spaced from a guide element at the second mentioned side of said path for removing a finishing cut from the first mentioned surface of the lumber piece, said cutter heads being disposed in closely juxtaposed relationship to each other along said path and said guide elements being disposed relative to each other and to said cutter heads to guide the lumber piece in a straight line through the machine and to closely embrace substantially throughout its length that portion of the lumber piece being planed which is disposed between said first and third cutter heads, whereby chattering of said portion of the lumber piece is prevented and smooth planing of the opposite faces thereof is assured.

4. A planing machine as set forth in claim 3 in which the means defining the path of travel for the lumber piece includes opposed guide elements at the discharge side of the third cutter head and closely adjacent thereto to closely engage the opposite planed surfaces of the lumber piece and to assist in holding against chattering that portion of the lumber piece which is being planed by the third cutter head.

THOMAS A. PETERSON.